(12) United States Patent
Chen

(10) Patent No.: US 10,769,805 B2
(45) Date of Patent: Sep. 8, 2020

(54) METHOD, IMAGE PROCESSING DEVICE, AND SYSTEM FOR GENERATING DEPTH MAP

(71) Applicant: Wistron Corporation, New Taipei (TW)

(72) Inventor: Li-Jen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 146 days.

(21) Appl. No.: 16/109,751

(22) Filed: Aug. 23, 2018

(65) Prior Publication Data

US 2019/0355141 A1  Nov. 21, 2019

(30) Foreign Application Priority Data

May 15, 2018 (TW) .............................. 107116405 A

(51) Int. Cl.
*G06T 7/593* (2017.01)
*G06T 7/13* (2017.01)
(Continued)

(52) U.S. Cl.
CPC .............. *G06T 7/593* (2017.01); *G06T 7/13* (2017.01); *G06T 7/564* (2017.01);
(Continued)

(58) Field of Classification Search
CPC . G06T 7/593; G06T 2207/10012; G06T 7/13; G06T 2207/20024;
(Continued)

(56) References Cited

U.S. PATENT DOCUMENTS

2012/0257013 A1* 10/2012 Witt .................... H04N 13/239
                                                              348/43
2013/0170736 A1* 7/2013 Guo ........................ G06T 5/002
                                                              382/154
(Continued)

FOREIGN PATENT DOCUMENTS

CN         102306393        7/2013
CN         105374039        3/2016
(Continued)

OTHER PUBLICATIONS

"Office Action of Taiwan Counterpart Application," dated Aug. 12, 2019, p1-p6.

*Primary Examiner* — Geoffrey E Summers
(74) *Attorney, Agent, or Firm* — JCIPRNET

(57) ABSTRACT

A method, an image processing device, and a system for generating a depth map are proposed. The method includes the following steps. A first original image and a second original image are obtained, and first edge blocks corresponding to the first original image and second edge blocks corresponding to the second original image are obtained. Depth information of edge blocks is generated according to the first edge blocks and the second edge blocks, and depth information of non-edge blocks is set according to the depth information of the edge blocks. The depth map is generated by using the depth information of the edge blocks and the depth information of the non-edge blocks.

18 Claims, 7 Drawing Sheets

(51) Int. Cl.
*H04N 13/271* (2018.01)
*G06T 7/564* (2017.01)

(52) U.S. Cl.
CPC .............. *G06T 2207/10012* (2013.01); *G06T 2207/20224* (2013.01); *H04N 13/271* (2018.05)

(58) Field of Classification Search
CPC .......... G06T 2207/10024; G06T 7/564; G06T 2207/20224; H04N 13/271; H04N 13/239; H04N 13/245; H04N 2013/0081; H04N 13/254; H04N 13/243
USPC ....................................................... 382/154
See application file for complete search history.

(56) References Cited

U.S. PATENT DOCUMENTS

| | | | |
|---|---|---|---|
| 2014/0055560 A1* | 2/2014 | Fu ........................... | G06T 5/005 348/42 |
| 2015/0222879 A1* | 8/2015 | Hamachi .............. | G06K 9/4604 348/47 |
| 2018/0120108 A1* | 5/2018 | Takahashi .............. | G06K 9/036 |
| 2018/0204329 A1 | 7/2018 | Cutu et al. | |

FOREIGN PATENT DOCUMENTS

| | | | | |
|---|---|---|---|---|
| EP | 2711894 A2 * | 3/2014 | .............. | G06T 7/11 |
| TW | 201327474 | 7/2013 | | |
| TW | 201721514 | 6/2017 | | |

* cited by examiner

METHOD, IMAGE PROCESSING DEVICE, AND SYSTEM FOR GENERATING DEPTH MAP

CROSS-REFERENCE TO RELATED APPLICATION

This application claims the priority benefit of Taiwan application serial no. 107116405, filed on May 15, 2018. The entirety of the above-mentioned patent application is hereby incorporated by reference herein and made a part of this specification.

BACKGROUND

Technical Field

The invention relates to a method, an image processing device, and a system for image processing. More particularly, the invention relates to a method, an image processing device, and a system for generating a depth map.

Description of Related Art

Through the development of frameworks in image processing, stereo vision has been extensively applied in many fields such as structured light, stereo image, distance detection, surveillance, and so forth. Stereo vision generally involves two stages. In the first stage, depth information is generated by using a depth camera, a stereo camera, or a related algorithm. In the second stage, a stereo image is generated by using the depth information. Hence, accurate depth information is rigidly important to provide a pleasant stereo viewing experience.

The fundamental of depth computation in stereo vision is to search for a same object from left and right images and determine an object distance on a basis of offsets of the object appearing in the two images (i.e. disparity). However, in a case where an object has less features such that no significant difference exists between neighboring pixels, this could result in error recognition and thereby obtain inaccurate depth information.

SUMMARY

The invention provides a method, an image processing device, and a system for generating a depth map, where a disparity map of a scene would be able to be precisely computed and the performance of subsequent stereo vision applications would be thereby enhanced.

In an embodiment of the invention, the method includes the following steps. A first original image and a second original image are obtained, and first edge blocks corresponding to the first original image and second edge blocks corresponding to the second original image are obtained. Depth information of edge blocks is generated according to the first edge blocks and the second edge blocks. Depth information of non-edge blocks is set according to the depth information of the edge blocks. The depth information of each of the non-edge blocks is associated with depth-filling directions of the neighboring edge blocks, and the depth-filling direction of each of the edge blocks is associated with a similarity between the edge block and a neighboring non-edge block of the edge block. The depth map is generated by using the depth information of the edge blocks and the depth information of the non-edge blocks.

In an embodiment of the invention, the system includes a first image sensor, a second image sensor, a memory, and a processor, where the processor is connected to the first image sensor, the second image sensor, and the memory. The first image sensor and the second image sensor are configured to capture images so as to respectively generate a first original image and a second original image. The memory is configured to store data. The processor is configured to: obtain the first original image and the second original image and obtain first edge blocks corresponding to the first original image and second edge blocks corresponding to the second original image; generate depth information of edge blocks according to the first edge blocks and the second edge blocks; set depth information of non-edge blocks according to the depth information of the edge blocks, where the depth information of each of the non-edge blocks is associated with depth-filling directions of the neighboring edge blocks, and the depth-filling direction of each of the edge blocks is associated with a similarity between the edge block and a neighboring non-edge block of the edge block; and generate the depth map by using the depth information of the edge blocks and the depth information of the non-edge blocks.

In an embodiment of the invention, the image processing device includes a memory and a processor, where the processor is connected to the memory. The memory is configured to store data. A communication interface is configured to allow the image processing device to be connected to the first image sensor and the second image sensor. The processor is configured to: obtain the first original image and the second original image and obtain first edge blocks corresponding to the first original image and second edge blocks corresponding to the second original image; generate depth information of edge blocks according to the first edge blocks and the second edge blocks; set depth information of non-edge blocks according to the depth information of the edge blocks, where the depth information of each of the non-edge blocks is associated with depth-filling directions of the neighboring edge blocks, and the depth-filling direction of each of the edge blocks is associated with a similarity between the edge block and a neighboring non-edge block of the edge block; and generate the depth map by using the depth information of the edge blocks and the depth information of the non-edge blocks.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
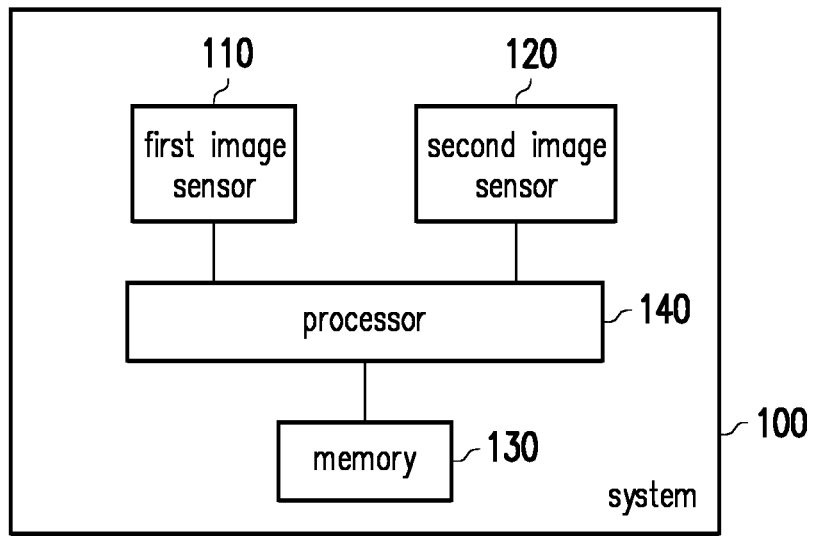
FIG. 1 is a block diagram illustrating a system for generating a depth map according to an embodiment of the invention.

Several embodiments of the invention are described in detail below accompanying with figures. In terms of the reference numerals used in the following descriptions, the same reference numerals in different figures should be considered as the same or the like elements. The embodiments are only a portion of the invention, which do not present all embodiments of the invention. To be more specifically, the embodiments serves as examples of the method, the image processing device, and the system fall within the scope of the claims of the invention.

FIG. 1 is a block diagram illustrating a system for generating a depth map according to an embodiment of the invention. It should be noted that the illustrations are provided to make the description more comprehensible and are not intended to limit the invention. All components and positional relationships among the components in the system are described in FIG. 1 first, and description of functions of the components is later disclosed in detail with reference to FIG. 2.

With reference to FIG. 1, a system 100 includes a first image sensor 110, a second image sensor 120, a memory 130, and a processor 140. In this embodiment, the system 100 may be an all-in-one image capturing device integrated with the first image sensor 110, the second image sensor 120, the memory 130, and the processor 140 such as a dual-lens digital camera, a single lens reflex camera, a digital video camcorder, a smart phone, a tablet PC, and the like.

In the present embodiment, the first image sensor 110 and the second image sensor 120 are photographing lenses including lenses and photosensitive devices. The photosensitive devices are configured to sense intensity of lights entering into the lenses and thereby produce images. The photosensitive devices may be, for example, charge coupled devices (CCDs), complementary metal-oxide semiconductor (CMOS) devices, or other devices. Images captured by the lenses are imaged on sensing devices and are converted into digital signals to be transmitted to the processor 140.

The memory 130 is configured to store data such as images and program codes and may be, for example, a fixed or movable random access memory (RAM) in any form, a read-only memory (ROM), a flash memory, a hard disc or other similar devices, and an integrated circuit and a combination thereof.

The processor 140 is configured for controlling operations among the components in the system 100 and may be, for example, a central processing unit (CPU), a graphic processing unit (GPU), a programmable microprocessor for general or special use, a digital signal processor (DSP), a programmable controller, an application specific integrated circuit (ASIC), a programmable logic device (PLD), any other similar device, or a combination of the foregoing devices.

Note that in another embodiment, the memory 130 and the processor 140 may be included in personal computers, notebook computers, smart phones, tablet computers, and other electronic devices with image processing functions and receive images of a specific scene captured by the first image sensor 110 and the second image sensor 120 from different angles in a wired or wireless manner through a communication interface (not shown) so as to generate the depth map. In this embodiment, the first image sensor 110 and the second image sensor 120 may be disposed in a same device or may be disposed in different devices. The invention is not limited in this regard.

An embodiment is provided hereinafter to elaborate steps of generating a depth map by the system 100 in detail. In the following embodiment, the system 100 is implemented as an image capturing device with dual lenses for illustrative purposes.

Figure 2:
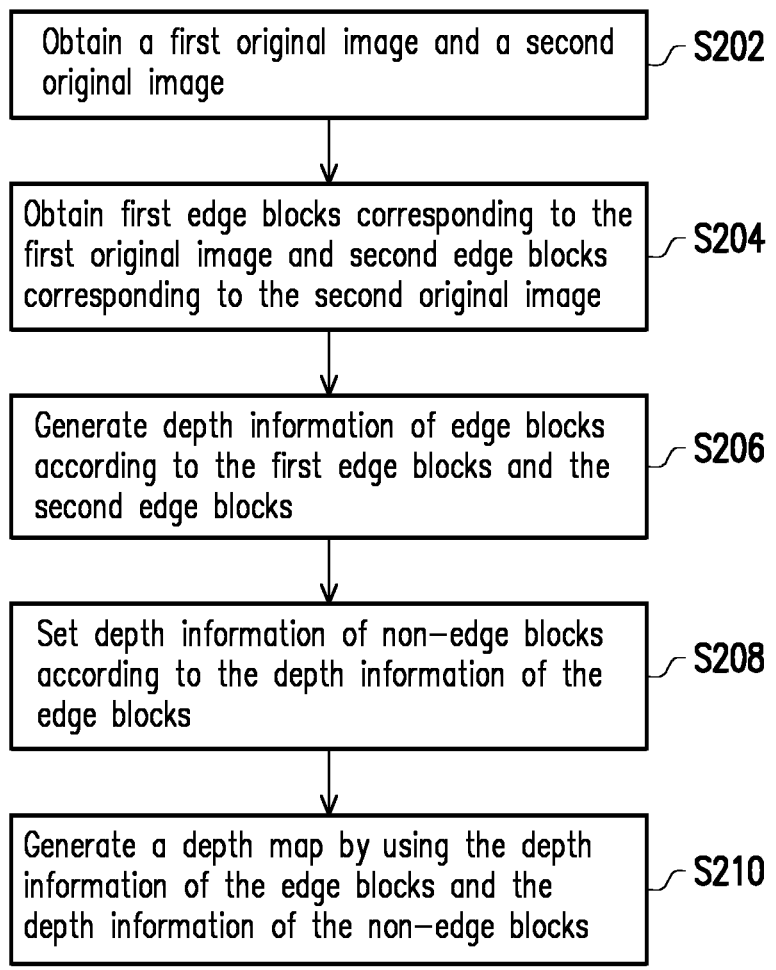
FIG. 2 is a flowchart illustrating a method of generating a depth map according to an embodiment of the invention.

FIG. 2 is a flowchart illustrating a method of generating a depth map according to an embodiment of the invention.

With reference to FIG. 1 and FIG. 2 together, first, the processor 140 obtains a first original image and a second original image (Step S202). To be specific, the processor 140 may capture images of a specific scene through the first image sensor 110 and the second image sensor 120 to respectively generate the first original image and the second original image. Hence, the first original image and the second original image are two images captured from a same scene from different angles of view. The first image sensor 110 and the second image sensor 120 may capture the images by using same photographing parameters, and yet the invention is not limited thereto.

Next, the processor 140 obtains first edge blocks corresponding to the first original image and second edge blocks corresponding to the second original image (Step S204). Herein, the first edge blocks and the second edge blocks are blocks having edge information respectively in the first original image and the second original image. To be specific, the processor 140 may perform edge detection on the first original image and the second original image so as to detect the first edge blocks and the second edge blocks respectively from the first original image and the second original image. The edge detection is an important step in computer vision. Such step is able to filter out edges with different characteristics through different types of filters so as to identify a boundary of an object in an image. Since the image capturing device with dual lenses is unable to obtain depth information of horizontal edges, the horizontal edges may be removed herein for convenience sake.

In an embodiment, the processor 140 may perform edge detection on the first original image and the second original image by using a vertical edge detection filter, so as to detect the vertical first edge blocks and the vertical second edge blocks respectively from the first original image and the second original image. The vertical edge detection filter may be a vertical Sobel operator Sby which is able to obtain vertical edge information directly from the two original images, where:

$$Sby = \begin{pmatrix} -1 & 0 & 1 \\ -2 & 0 & 2 \\ -1 & 0 & 1 \end{pmatrix}$$

In an embodiment, the processor 140 may perform edge detection on the first original image and the second original image by using an omnidirectional edge detection filter, so as to detect first omni-edge blocks and the second omni-edge blocks respectively from the first original image and the second original image. The processor 140 may further perform edge detection on the first original image and the second original image by using a horizontal edge detection filter, so as to detect first horizontal edge blocks and second horizontal edge blocks respectively from the first original image and the second original image. Afterwards, the processor 140 may perform subtraction on the first omni-edge blocks and the first horizontal edge blocks for generating the first edge blocks and performs subtraction on the second omni-edge blocks and the second horizontal edge blocks for generating the second edge blocks. The omnidirectional edge detection filter may be a Laplacian operator L, where:

$$L = \begin{pmatrix} -1 & -1 & -1 \\ -1 & 8 & -1 \\ -1 & -1 & -1 \end{pmatrix}$$

The horizontal edge detection filter may be a horizontal Sobel operator Sbx, where:

$$Sbx = \begin{pmatrix} -1 & -2 & -1 \\ 0 & 0 & 0 \\ 1 & 2 & 1 \end{pmatrix}$$

Next, the processor 140 generates depth information of edge blocks according to the first edge blocks and the second edge blocks (Step S206). In other words, the processor 140 may obtain the depth information of the edge blocks by performing stereo matching first according to the edge blocks appearing in both original images at the same time by leveraging a depth search algorithm. As for the edge blocks appearing in only one original image (i.e., the edge blocks are obstructed in the other original image), depth information of such edge blocks are estimated by using the steps as follows.

Next, the processor 140 sets depth information of non-edge blocks according to the depth information of the edge blocks (Step S208). Herein, the processor 140 may estimate the depth information of the non-edge blocks according to the obtained depth information of the edge blocks with reference to at least one of the original images. The processor 140 may estimate the depth information of each of the non-edge blocks according to a depth-filling direction of a neighboring edge block of the non-edge block, where the depth-filling direction of the edge block is a similarity between the edge block and a neighboring block.

Figure 3:
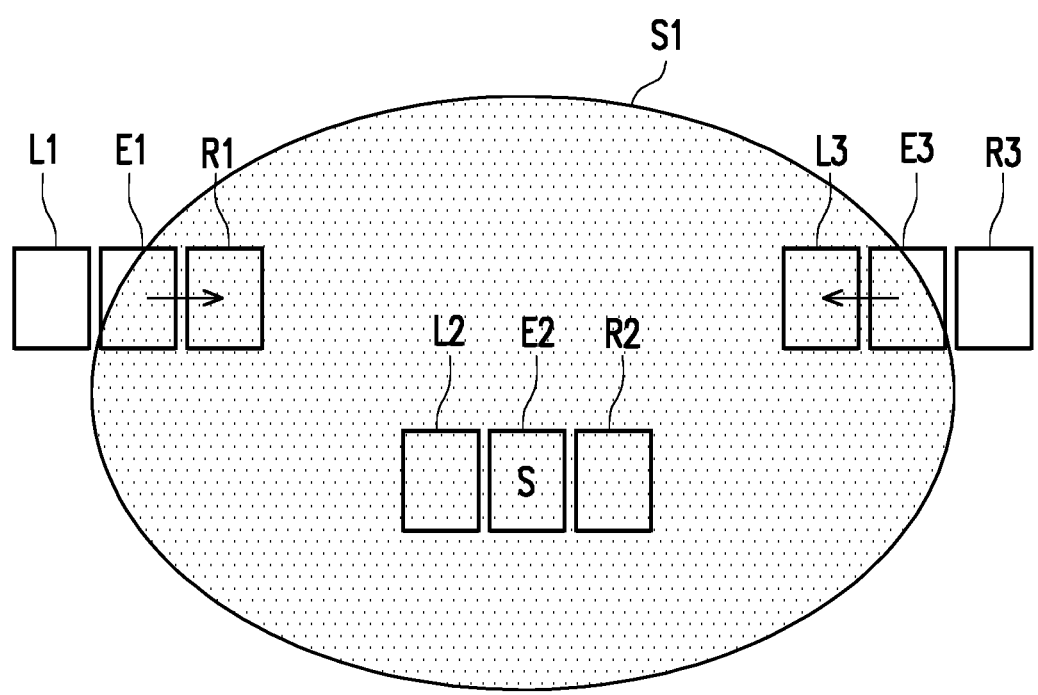
FIG. 3 is a schematic diagram illustrating an edge block and a depth-filling direction thereof according to an embodiment of the invention.

Specifically, FIG. 3, which is a schematic diagram illustrating an edge block and a depth-filling direction thereof according to an embodiment of the invention, is taken as an example, where S1 is an object captured in the original images. Since an edge block E1 belongs to the object S1, that is, the edge block E1 is more similar to a right block R1 in color, a depth-filling direction of the edge block E1 is "right". Note that in the present embodiment, a block with n×m pixels (e.g., 9×9 pixels) in the object S1 is compared to determine whether the edge block E1 belongs to the object S1 so that misjudgment caused by using a single pixel for determination is prevented. Nevertheless, in other embodiments, a single pixel in the object S1 may be used for comparison. The invention is not limited in this regard. Similarly, since an edge block E3 belongs to the object S1 as well, that is, the edge block E3 is more similar to a left block L3 in color, a depth-filling direction of the edge block E3 is "left". From another perspective, S is a single feature such as a character, a pattern, etc. captured in the original images and is regarded as an edge block E2 herein. A depth-filling direction of the edge block E2 is "null".

Accordingly, when processing each of the non-edge blocks, the processor 140 may first obtain depth-filling directions of a left edge block and a right edge blocks closest to the non-edge block among the edge blocks and then set depth information of the non-edge block according to the depth-filling direction of the left edge block and the depth-filling direction of the right edge block. Taking FIG. 3 for example, a block R1 is a non-edge block, and the processor 140 sets depth information of the block R1 according to the depth-filling directions of the left edge block E1 and the right edge block E3 closest to the block R1. A method of setting the depth information of the non-edge blocks is to be described in detail in the following embodiments.

With reference to FIG. 2 again, afterwards, the processor 140 generates the depth map by using the depth information of the edge blocks and the depth information of the non-edge blocks (Step S210). That is, the processor 140 may estimate depth information corresponding to an object having less features by using more accurate depth information obtained by calculating an object having more features in the specific scene, so as to reduce noise signals. In this way, a more accurate depth estimation would be achieved in a more efficient fashion, and the performance of subsequent stereo vision applications would be thereby enhanced.

Figure 4:
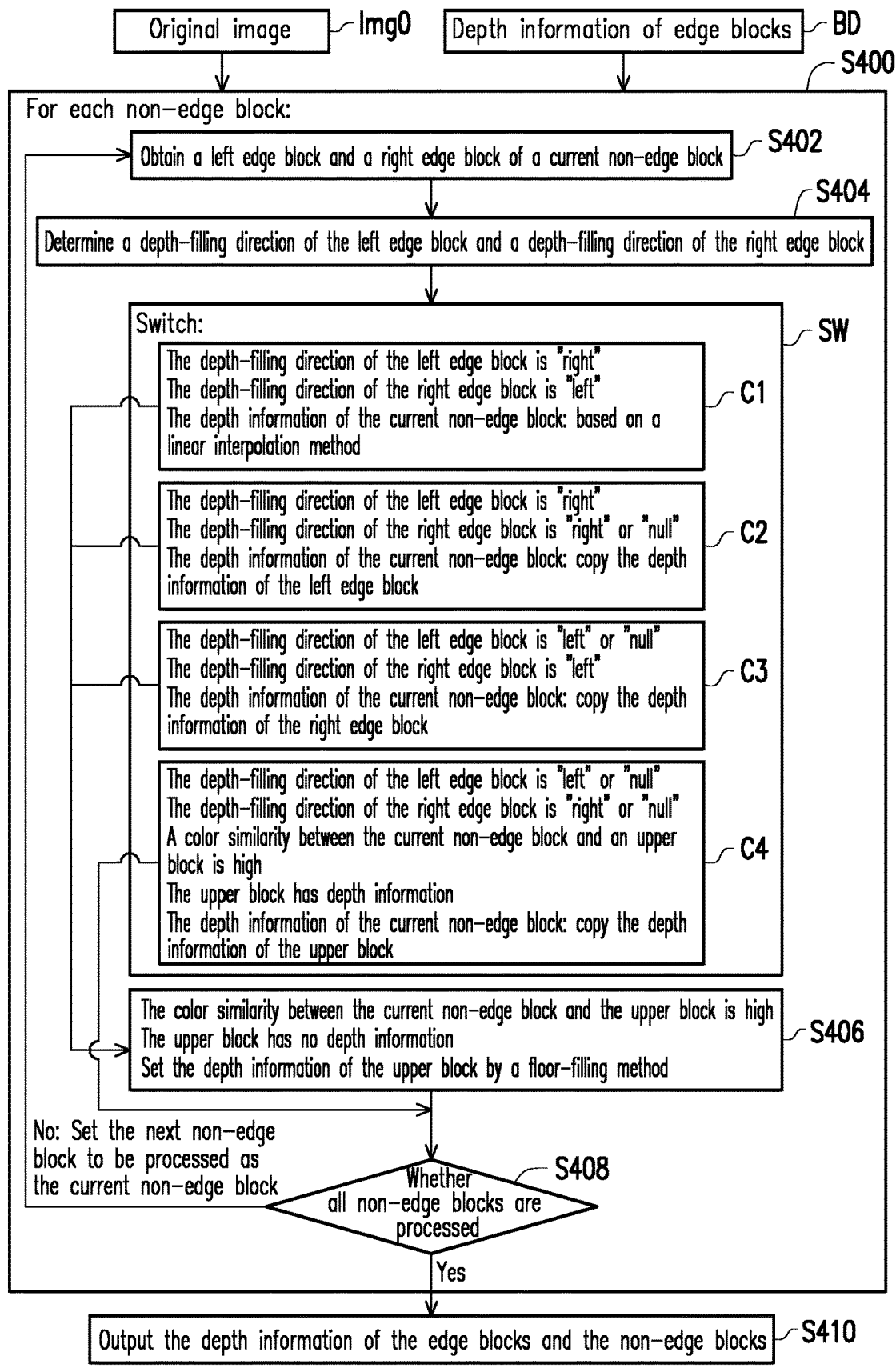
FIG. 4 is a flowchart illustrating a method of setting depth information of non-edge blocks according to an embodiment of the invention.

For ease of description, FIG. 4, which is a flowchart illustrating a method of setting depth information of non-edge blocks according to an embodiment of the invention, is used to specifically describe implementations and implementation details of Step S208 and Step S210 in FIG. 2, and the flowchart of FIG. 4 may also be implemented by the system 100.

Before the steps of FIG. 4 are performed, processor 140 has already obtained the first original image, the second original image, and the depth information of the edge blocks. The processor 140 sets at least one of the first original image and the second original image as an image to be used in the flowchart of FIG. 4, and the image is referred to as an "original image" hereinafter.

With reference to FIG. 4, after obtaining an original image Img0 and depth information BD of the edge blocks, the processor 140 performs a depth estimation by processing each of the non-edge blocks (Step S400). In this embodiment, the processor 140 may sequentially process each of the non-edge blocks of the original image according to an order of left to right and up to down, but the invention is not limited thereto. In the following description, the non-edge block that the processor 140 is processing is defined as a "current non-edge block". Next, the processor 140 obtains a left edge block and a right edge block of the current non-edge block (Step S402) and determines a depth-filling direction of the left edge block and a depth-filling direction of the right edge block (Step S404).

Figure 5A:
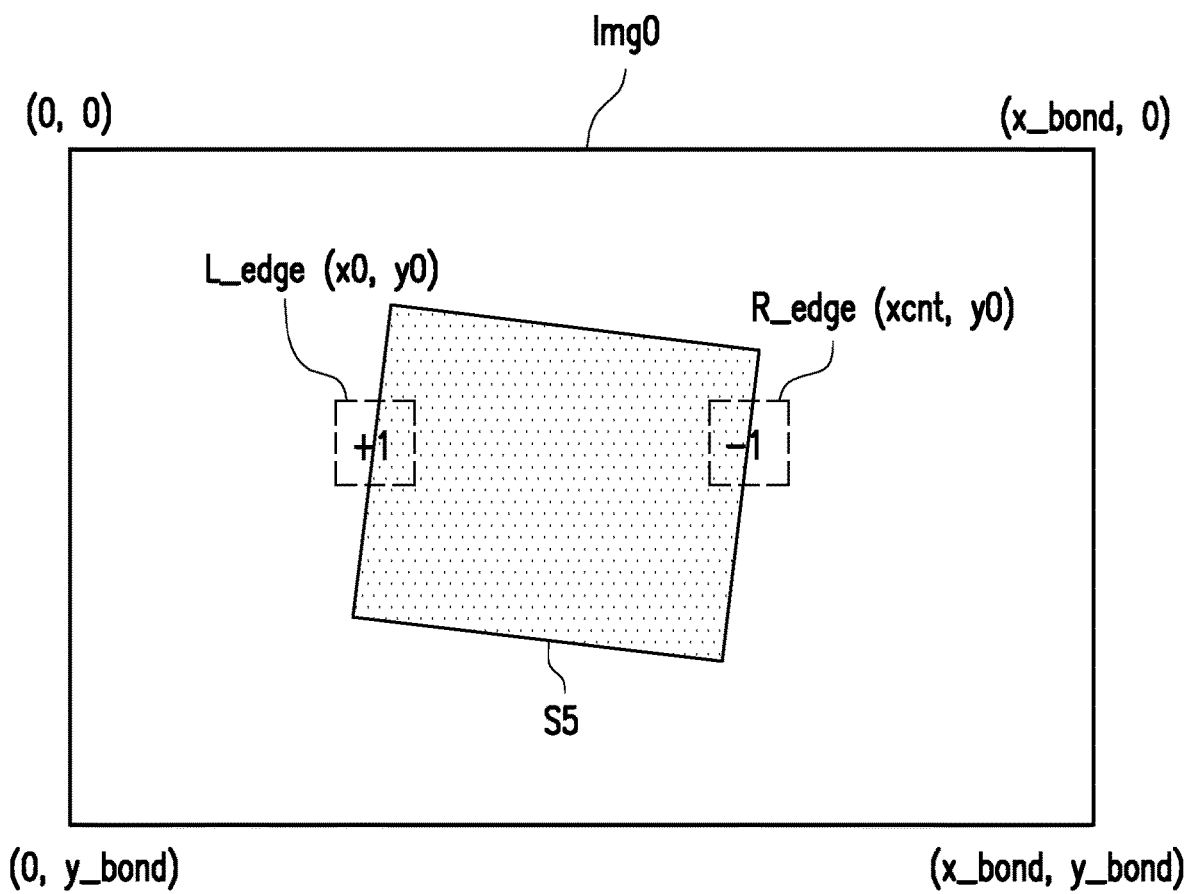
FIG. 5A is a schematic diagram illustrating an original image according to an embodiment of the invention.

Specifically, FIG. 5A, which is a schematic diagram illustrating an original image Img0 according to an embodiment of the invention, is taken as an example, and (0, 0), (x_bond, 0), (0, y_bond), and (x_bond, y_bond) are coordinates of four end points of the original image Img0. It is assumed that the processor 140 is processing a pixel row ycnt=y0 and obtains a leftmost edge block L_edge corresponding to an object S5. The leftmost edge block L_edge acts as the left edge block, and (x0, y0) are the coordinates of the left edge block L_edge. Next, the processor 140 searches for a next edge block R_edge to a right side of the same pixel row ycnt=y0. The edge block R_edge acts as the right edge block, and (xcnt, y0) are the coordinates of the right edge block R_edge. All pixels located between the left edge block L_edge and the right edge block R_edge in the pixel row ycnt=y0 are then regarded as the current non-edge block by the processor 140.

Herein, the processor 140 first determines color similarities between the left edge block L_edge and a left block and a right block. The color similarity between the left edge block L_edge and the right block is determined to be high herein, and thereby, a depth-filling direction of the left edge block L_edge is set to be "right" and may be recorded as "+1". Next, the processor 140 determines color similarities between the right edge block R_edge and a left block and a right block. The color similarity between the right edge block R_edge and the left block is determined to be high herein, and thereby, a depth-filling direction of the right edge block R_edge is set to be "left" and may be recorded as "−1". As a side note, if the processor 140 determines that the color similarities between the right edge block R_edge and the left block and the right block are both not high or determines that the color similarities between the right edge block R_edge and the left block and the right block are both high (e.g., one of the left block and the right block is set to be "+1, and the other one is set to be "−1"), the depth-filling direction is "null" and is recorded as "0" by the processor 140. Herein, the comparison of color similarity between two blocks is made by determining whether a difference value between pixel values of the two blocks is less than a threshold. When the difference value is less than the threshold, the color similarity is determined to be high, and on the contrary, the color similarity is determined to be low.

Next, the processor 140 sets depth information of the current non-edge block according to depth-filling directions of a left edge block and a right edge block of the current non-edge block. First, the processor 140 performs a switch (SW) so as to determine if any of four conditions C1 to C4 is satisfied.

When entering the condition C1, the processor 140 determines that the depth-filling direction of the left edge block is "right" and the depth-filling direction of the right edge block is "left", and it means that the left edge block and the right edge block both correspond to the same object. Hence, the processor 140 sets the depth information of the current non-edge block according to a linear interpolation method for continuity purposes. For instance, it is assumed that a depth value of the left edge block is 1, a depth value of the right edge block is 5, and the current non-edge block occupies 3 pixels. After the linear interpolation method is performed, pixel values of the current non-edge block are 2, 3, and 4.

When entering the condition C2, the processor 140 determines that the depth-filling direction of the left edge block is "right" and the depth-filling direction of the right edge block is "right" or "null". It means that the left edge block and the right edge block correspond to different objects, and thus the depth information is discontinuous. Herein, since the depth-filling direction of the left edge block is "right", the left edge block and the current non-edge block belong to the same object. The processor 140 thus sets the depth information of the current non-edge block by copying the depth information of the left edge block. For instance, it is assumed that the depth value of the left edge block is 1, the depth value of the right edge block is 5, and the current non-edge block occupies 3 pixels. After copying is performed, the pixel values of the current non-edge block are 1, 1, and 1.

On the other hand, when entering the condition C3, the processor 140 determines that the depth-filling direction of the left edge block is "left" or "null" and the depth-filling direction of the right edge block is "left". It means that the left edge block and the right edge block correspond to different objects, and the depth information is discontinuous. Herein, since the depth-filling direction of the right edge block is "left", the right edge block and the current non-edge block belong to the same object. The processor 140 thus sets the depth information of the current non-edge block by copying the depth information of the right edge block. For instance, it is assumed that the depth value of the left edge block is 1, the depth value of the right edge block is 5, and the current non-edge block occupies 3 pixels. After copying is performed, the pixel values of the current non-edge block are 5, 5, and 5.

Figure 5B:
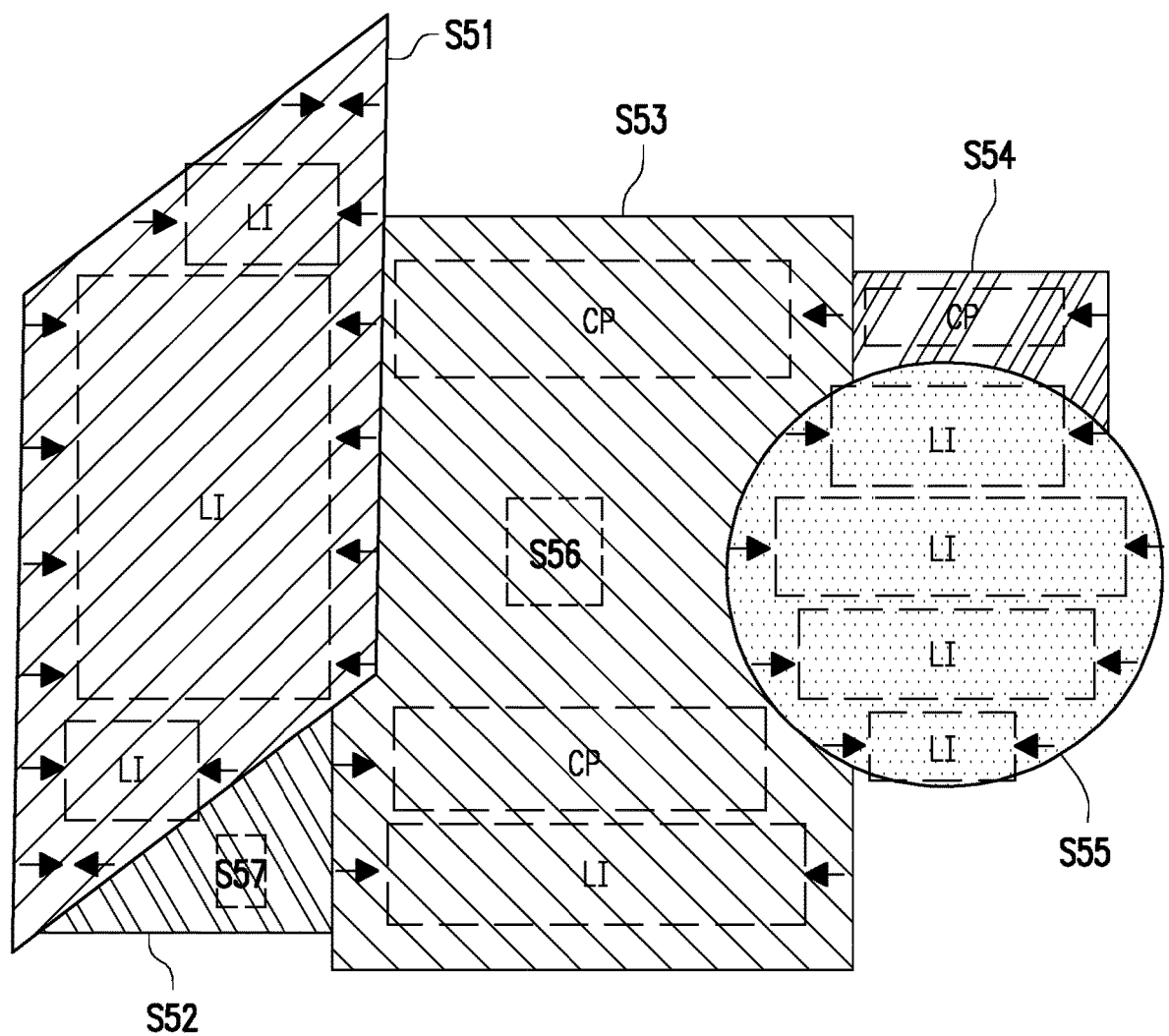
FIG. 5B is a schematic diagram illustrating a method of setting depth information according to an embodiment of the invention.

To be specific, FIG. 5B, which is a schematic diagram illustrating a method of setting depth information according to an embodiment of the invention, is taken as an example, and S51 to S57 belong to five different objects. Left arrows and right arrows are respectively used to indicate the depth-filling directions of the edge blocks to be in the left direction and the right direction, and the depth-filling direction of the "null" direction is not shown. Herein, the processor 140 sets the depth information of the non-edge block between the left edge block with the depth-filling direction of "right" and the right edge block with the depth-filling direction of "left" through a linear interpolation method LI. In addition, the processor 140 sets the depth information of the non-edge block between the left edge block with the depth-filling direction of "right" and the right edge block with the depth-filling direction of "right" or "null" or between the left edge block with the depth-filling direction of "left" or "null" and the right edge block with the depth-filling direction of "left" through a copying method CP.

With reference back to FIG. 4, when entering the condition C4, the processor 140 determines that the depth-filling direction of the left edge block is "left" or "null" and the depth-filling direction of the right edge block is "right" or "null". It means that the left edge block and the right edge block correspond to different objects, and it also means that the current non-edge block, the left edge block, and the right edge block all corresponds to different objects. Herein, the processor 140 obtains the left edge block, the current non-edge block, and an upper block of the right edge block, where the upper block is a pixel row located right above the left edge block, the current non-edge block, and the right edge block. Taking FIG. 5A for example, the upper block may be expressed as ([x0:xcnt], y0−1), meaning that the upper block includes pixels of and between (x0, y0−1) and (xcnt, y0−1). The processor 140 determines whether similarity between colors of the current non-edge block and the upper block is high and whether the upper block has depth information. If yes, the processor 140 then sets the depth information of the current non-edge block by copying the depth information of the upper block.

Figure 5C:
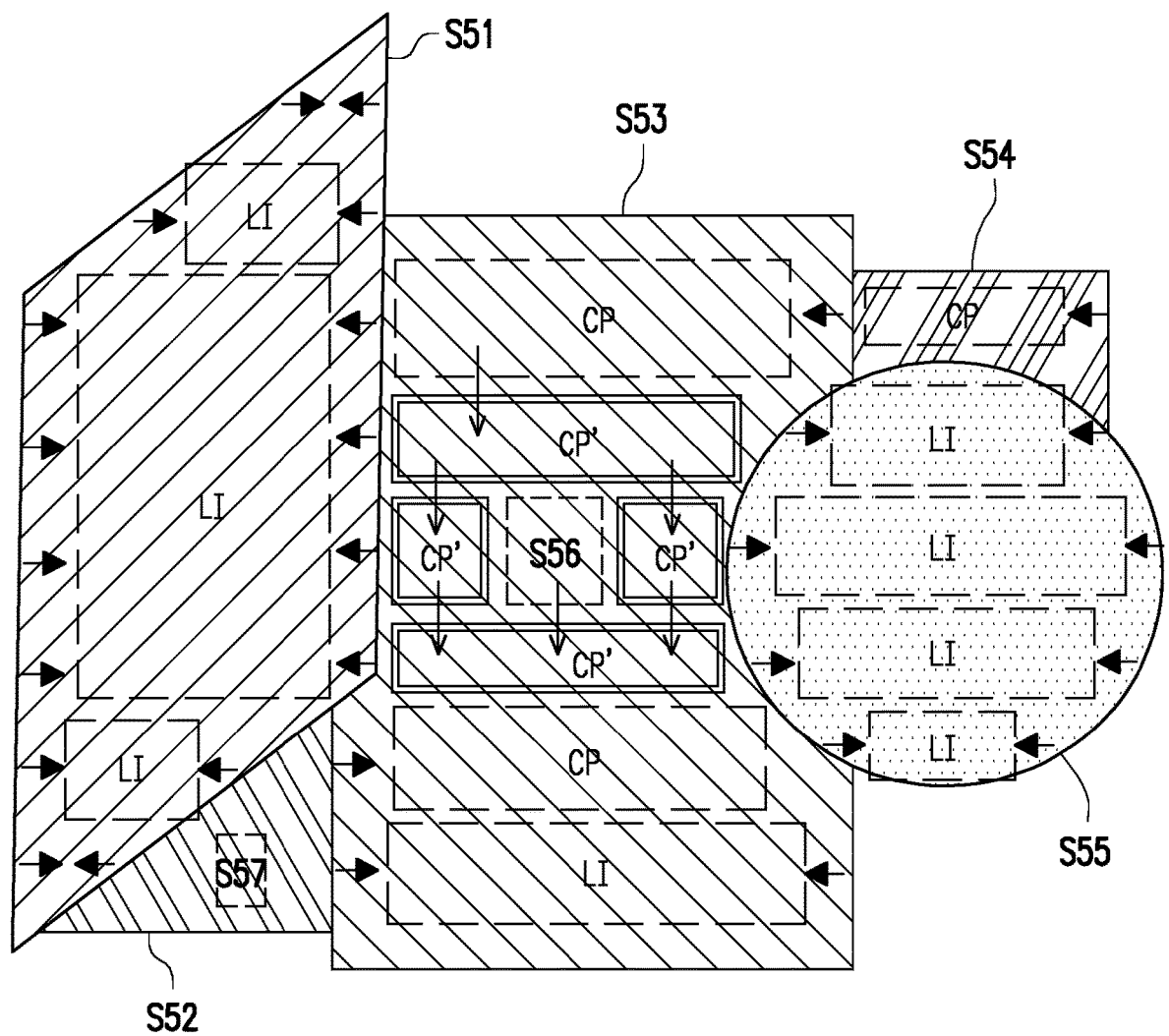
FIG. 5C is a schematic diagram illustrating a method of setting depth information according to an embodiment of the invention.

To be specific, FIG. 5C, which is a schematic diagram illustrating a method of setting depth information according to an embodiment of the invention, is taken as an example. The processor 140 sets the depth information of the non-edge block between the left edge block with the depth-filling direction of "left" or "null" and the right edge block with the depth-filling direction of "right" or "null" by copying an upper block CP'.

Figure 5D:
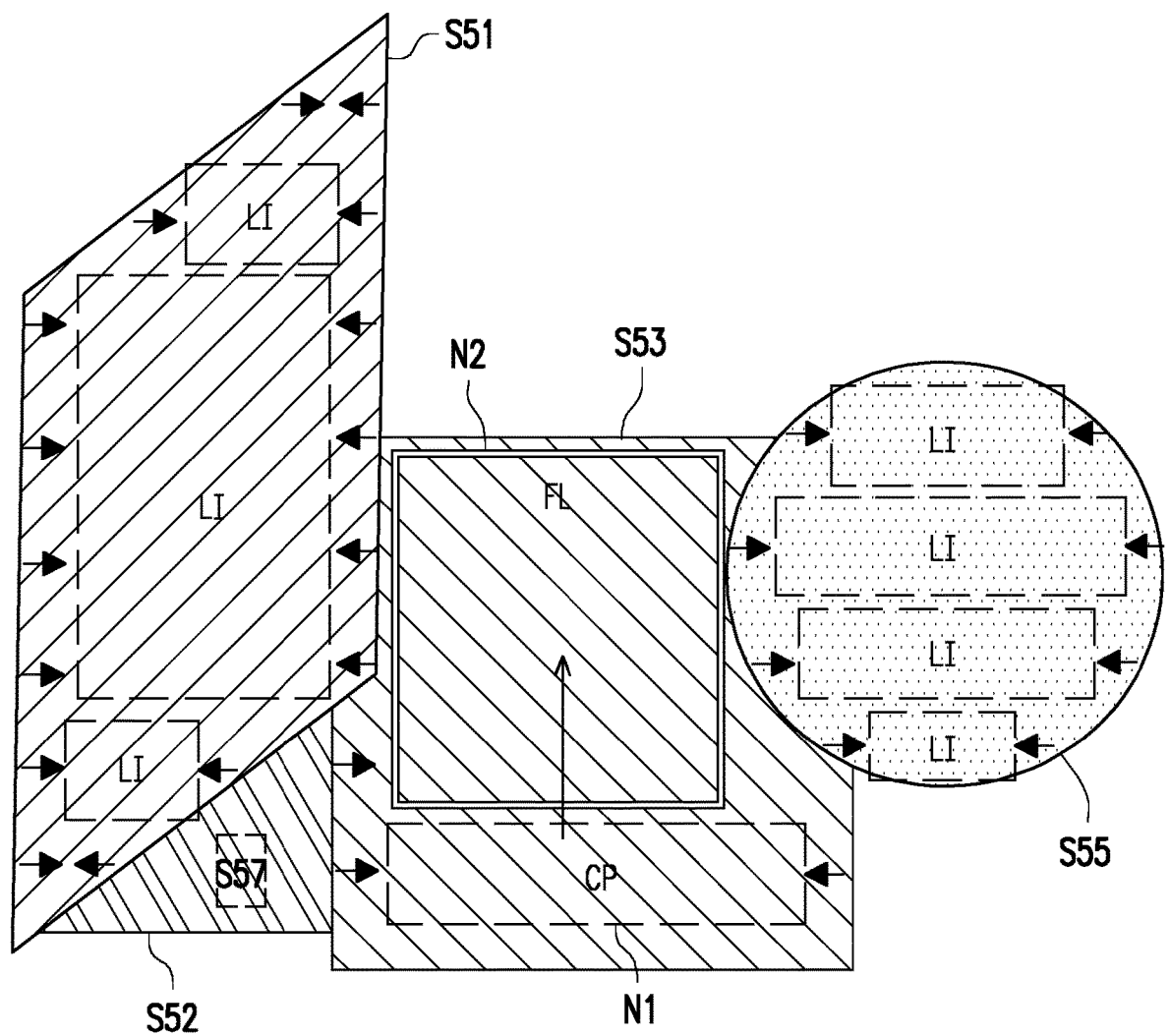
FIG. 5D is a schematic diagram illustrating a method of setting depth information according to an embodiment of the invention.

With reference to FIG. 4 again, after the processor 140 enters the condition C1, the condition C2, or the condition C3 and obtains the depth information of the current non-edge block, Step S406 is performed. The processor 140 determines whether the similarity between the colors of the current non-edge block and the upper block is high and whether the upper block has depth information. If the upper block does not have any depth information, the processor 140 sets the depth information of the upper block according to the depth information of the current non-edge block based on a floor filling method. FIG. 5D, which is a schematic diagram illustrating a method of setting depth information according to an embodiment of the invention, is taken as an example. After obtaining depth information of a non-edge block N1 and determining a non-edge block N2 lacks depth information, the processor 140 sets the depth information of the non-edge block N2 as the depth information of the non-edge block N1 through a floor filling method FL.

Next, the processor 140 determines whether all of the non-edge blocks are processed (Step S408). If no, the processor 140 sets the next non-edge block to be processed as the current non-edge block, and Step S402 is then performed again. If yes, it means that all of the non-edge blocks are processed by the processor 140, and setting of the depth information of the non-edge blocks is completed. Hence, the depth information of the edge blocks and the non-edge blocks is outputted (Step S410) to generate the depth map of the specific scene.

In view of the foregoing, in the method, the image processing device, and the system for generating the depth map, the depth information corresponding to blocks with no edge information is estimated by using more precise depth information calculated based on obtained through calculating blocks with edge information in a specific scene, so as to reduce noise signals and to achieve a more accurate depth estimation. Therefore, the effectiveness of stereo vision application such as structured light, stereo, distance detection, and surveillance would be greatly enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for generating a depth map, applicable to a system having a first image sensor and a second image sensor, and the method comprising the following steps:
    obtaining a first original image and a second original image, and obtaining a plurality of first edge blocks corresponding to the first original image and a plurality of second edge blocks corresponding to the second original image;
    generating depth information of a plurality of matched edge blocks according to the first edge blocks and the second edge blocks;
    setting depth information of a plurality of non-edge blocks according to the depth information of the matched edge blocks and depth-filling directions of the matched edge blocks, wherein the depth information of each of the non-edge blocks is associated with the depth-filling directions of the matched edge blocks neighboring to the non-edge blocks, and the depth-filling direction of each of the matched edge blocks is associated with a similarity between the matched edge block and a neighboring non-edge block of the matched edge block; and
    generating the depth map by using the depth information of the matched edge blocks and the depth information of the non-edge blocks.

2. The method according to claim 1, wherein the step of obtaining the first edge blocks corresponding to the first original image and the second edge blocks corresponding to the second original image comprises:
    performing edge detection on the first original image and the second original image by using a vertical edge detection filter so as to detect the first edge blocks and the second edge blocks respectively from the first original image and the second original image.

3. The method according to claim 1, wherein the step of obtaining the first edge blocks corresponding to the first original image and the second edge blocks corresponding to the second original image comprises:
    performing edge detection on the first original image and the second original image by using an omnidirectional edge detection filter so as to detect a plurality of first omni-edge blocks and a plurality of second omni-edge blocks respectively from the first original image and the second original image;
    performing edge detection on the first original image and the second original image by using a horizontal edge detection filter so as to detect a plurality of first horizontal edge blocks and a plurality of second horizontal edge blocks respectively from the first original image and the second original image;
    performing subtraction on the first omni-edge blocks and the first horizontal edge blocks so as to generate the first edge blocks; and
    performing subtraction on the second omni-edge blocks and the second horizontal edge blocks so as to generate the second edge blocks.

4. The method according to claim 1, wherein before the step of setting the depth information of the non-edge blocks according to the depth information of the matched edge blocks and the depth-filling directions of the matched edge blocks, the method further comprises:
    determining the depth-filling direction of each of the matched edge blocks according to at least one of the first original image and the second original image, wherein
    the depth-filling direction of the matched edge block is left in response that a color similarity between the matched edge block and a left block thereof is high,
    the depth-filling direction of the matched edge block is right in response that a color similarity between the matched edge block and a right block thereof is high, and the depth-filling direction of the matched edge block is null in response that the color similarity between the matched edge block and the left block thereof and the color similarity between the matched edge block and the right block thereof are both high or both low or in response that the matched edge block is a single feature.

5. The method according to claim 4, wherein the step of setting the depth information of the non-edge blocks according to the depth information of the matched edge blocks and the depth-filling directions of the matched edge blocks comprises:
    for each of the non-edge blocks:

obtaining depth-filling directions of a left edge block and a right edge block closest to the non-edge block among the matched edge blocks; and setting the depth information of the non-edge block according to the depth-filling direction of the left edge block and the depth-filling direction of the right edge block.

6. The method according to claim 5, wherein the depth information of each of the non-edge blocks is associated with at least one of the depth information of the left edge block, the depth information of the right edge block, depth information of an upper block, and depth information of a lower block.

7. The method according to claim 5, wherein the non-edge blocks comprise a current non-edge block, the depth-filling direction of the left edge block of the current non-edge block is right, the depth-filling direction of the right edge block of the current non-edge block is left, and the step of setting the depth information of the current non-edge block comprises:

setting the depth information of the current non-edge block according to depth information of the left edge block and depth information of the right edge block based on a linear interpolation method.

8. The method according to claim 5, wherein the non-edge blocks comprise a current non-edge block, the depth-filling direction of the left edge block of the current non-edge block is right, the depth-filling direction of the right edge block of the current non-edge block is right or null, and the step of setting the depth information of the current non-edge block comprises:

setting the depth information of the current non-edge block by copying the depth information of the left edge block.

9. The method according to claim 5, wherein the non-edge blocks comprise a current non-edge block, the depth-filling direction of the left edge block of the current non-edge block is left or null, the depth-filling direction of the right edge block of the current non-edge block is left, and the step of setting the depth information of the current non-edge block comprises:

setting the depth information of the current non-edge block by copying the depth information of the right edge block.

10. The method according to claim 5, wherein the non-edge blocks comprise a current non-edge block, the depth-filling direction of the left edge block of the current non-edge block is left or null, the depth-filling direction of the right edge block of the current non-edge block is right or null, an upper block exists on top of the current non-edge block, and the step of setting the depth information of the current non-edge block comprises:

determining whether a color similarity between the current non-edge block and the upper block is high and whether the upper block has depth information; and setting the depth information of the current non-edge block by copying the depth information of the upper block in response that the color similarity between the current non-edge block and the upper block is determined to be high and the upper block is determined to have the depth information.

11. The method according to claim 5, wherein the non-edge blocks comprise a current non-edge block, an upper block exists on top of the current non-edge block, and after the step of setting the depth information of the current non-edge block, the method further comprises:

determining whether a color similarity between the current non-edge block and the upper block is high and whether the upper block has depth information; and setting the depth information of the upper block based on a floor filling method according to the depth information of the current non-edge block in response that the color similarity between the current non-edge block and the upper block is determined to be high and the upper block is determined not to have the depth information.

12. A system for generating a depth map, comprising:

a first image sensor and a second image sensor, configured to capture images so as to respectively generate a first original image and a second original image;

a memory, configured to store data;

a processor, connected to the first image sensor, the second image sensor, and the memory, and configured to:

obtain the first original image and the second original image, and obtain a plurality of first edge blocks corresponding to the first original image and a plurality of second edge blocks corresponding to the second original image;

generate depth information of a plurality of matched edge blocks according to the first edge blocks and the second edge blocks;

set depth information of a plurality of non-edge blocks according to the depth information of the matched edge blocks and depth-filling directions of the matched edge blocks, wherein the depth information of each of the non-edge blocks is associated with the depth-filling directions of the matched edge blocks neighboring to the non-edge blocks, and the depth-filling direction of each of the matched edge blocks is associated with a similarity between the matched edge block and a neighboring non-edge block of the matched edge block; and generate the depth map by using the depth information of the matched edge blocks and the depth information of the non-edge blocks.

13. The system according to claim 12, wherein the processor determines the depth-filling direction of each of the matched edge blocks according to at least one of the first original image and the second original image, wherein the depth-filling direction of the matched edge block is left in response that a color similarity between the matched edge block and a left block thereof is high, the depth-filling direction of the matched edge block is right in response that a color similarity between the matched edge block and a right block thereof is high, and the depth-filling direction of the matched edge block is null in response that the color similarity between the matched edge block and the left block thereof and the color similarity between the matched edge block and the right block thereof are both high or both low or in response that the matched edge block is a single feature.

14. The system according to claim 13, wherein for each of the non-edge blocks, the processor obtains depth-filling directions of a left edge block and a right edge block closest to the non-edge block among the matched edge blocks and sets the depth information of the non-edge block according to the depth-filling direction of the left edge block and the depth-filling direction of the right edge block.

15. The system according to claim 14, wherein the depth information of each of the non-edge blocks is associated with at least one of the depth information of the left edge block, the depth information of the right edge block, depth information of an upper block, and depth information of a lower block.

16. An image processing device, comprising:
a memory, configured to store data; and
a processor, connected to the memory and configured to:
obtain a first original image and a second original image and obtaining a plurality of first edge blocks corresponding to the first original image and a plurality of second edge blocks corresponding to the second original image;
generate depth information of a plurality of matched edge blocks according to the first edge blocks and the second edge blocks;
set depth information of a plurality of non-edge blocks according to the depth information of the matched edge blocks and depth-filling directions of the matched edge blocks, wherein the depth information of each of the non-edge blocks is associated with the depth-filling directions of the matched edge blocks neighboring to the non-edge blocks, and the depth-filling direction of each of the matched edge blocks is associated with a similarity between the matched edge block and a neighboring non-edge block of the matched edge block; and
generate the depth map by using the depth information of the matched edge blocks and the depth information of the non-edge blocks.

17. The image processing device according to claim 16, wherein the processor determines the depth-filling direction of each of the matched edge blocks according to at least one of the first original image and the second original image, wherein the depth-filling direction of the matched edge block is left in response that a color similarity between the matched edge block and a left block thereof is high, the depth-filling direction of the matched edge block is right in response that a color similarity between the matched edge block and a right block thereof is high, the depth-filling direction of the matched edge block is null in response that the color similarity between the matched edge block and the left block thereof and the color similarity between the matched edge block and the right block thereof are both high or both low or in response that the corresponding edge block is a single feature.

18. The image processing device according to claim 17, wherein for each of the non-edge blocks, the processor obtains depth-filling directions of a left edge block and a right edge block closest to the non-edge block among the matched edge blocks and sets the depth information of the non-edge block according to the depth-filling direction of the left edge block and the depth-filling direction of the right edge block, wherein the depth information of each of the non-edge blocks is associated with at least one of the depth information of the left edge block, the depth information of the right edge block, depth information of an upper block, and depth information of a lower block.

* * * * *